(No Model.)
A. PRENTISS.
PLANT AND SEED PROTECTOR.
No. 303,543. Patented Aug. 12, 1884.
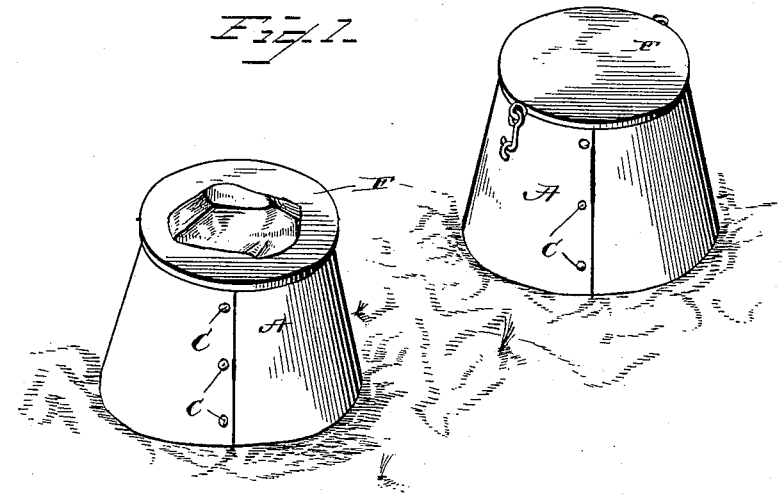
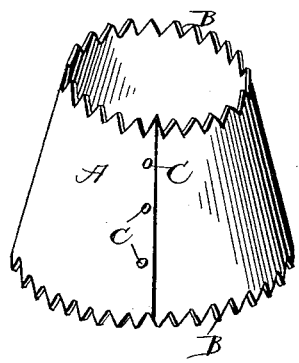
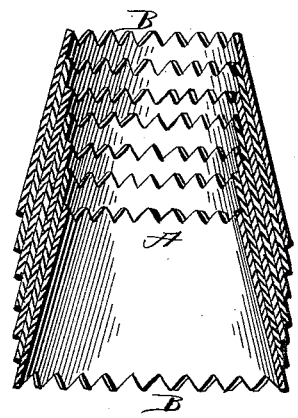
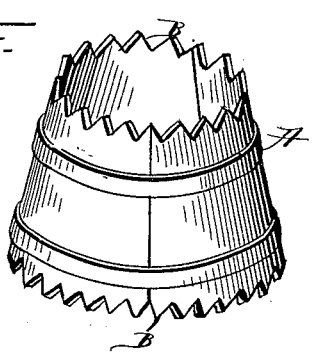
WITNESSES
F. L. Ourand
E. G. Siggers
Arthur Prentiss
INVENTOR
by C. A. Snow & Co
Attorneys

UNITED STATES PATENT OFFICE.

ARTHUR PRENTISS, OF PRENTISS VALE, PENNSYLVANIA.

PLANT AND SEED PROTECTOR.

SPECIFICATION forming part of Letters Patent No. 303,543, dated August 12, 1884.

Application filed April 23, 1884. (No model.)

*To all whom it may concern:*

Be it known that I, ARTHUR PRENTISS, a citizen of the United States, residing at Prentiss Vale, in the county of McKean and State of Pennsylvania, have invented a new and useful Plant and Seed Protector, of which the following is a specification, reference being had to the accompanying drawings.

This invention relates to plant and seed protectors; and it has for its object to provide a simple, durable, inexpensive, and convenient device which is adapted to be applied or set around small plants to protect them from the ravages of worms, bugs, and other insects.

A further object of the invention is to provide a device which may be set around the seed after it has been planted, to obtain early germination, to protect the same from the usual insects that infest a garden, and to allow transplanting without disturbing the roots; and a further object of the invention is to provide a protector for plants and seeds which will be offensive to insects and small animals by coating or saturating the protector with petroleum or other preparation.

With these and other objects in view the said invention consists in certain details of construction and combination of parts, as hereinafter set forth, and particularly pointed out in the claim.

In the accompanying drawings, Figure 1 is a perspective view illustrating my improvement in use. Fig. 2 is a detail perspective view of the protector. Fig. 3 is a view illustrating the manner in which they are packed for transportation. Fig. 4 is a view of a modification.

Like letters refer to corresponding parts in the several figures.

Referring to the drawings, A designates the body of my improved plant and seed protector, formed of one piece of sheet metal, paper, thin wood, or other suitable material coated with a suitable composition of ingredients to make the protector offensive to worms, bugs, and other insects, and also render the same more firm and durable, the ends of the body of the protector being connected by rivets, solder, or other fastening means, as at C. The body of the protector is made round, oval, or other form, and tapering from end to end, as shown, so that it may be readily applied to the plant either end up, and may be packed together in a small space convenient for transportation, storing, and handling. Either or both the upper and lower edges of the protector may be serrated, as shown at B, the serrations engaging with the ground in order to support the same and prevent accidental displacement.

When it is desired to protect the plant or seed from the rays of the sun, or from the state of the surrounding atmosphere, covers F, made of any suitable form and material, may be placed on the top of the protector and secured thereto by suitable means, as will be seen.

As shown in Fig. 5, the body of the protector may be made of several pieces connected together by tacks, staples, rivets, hoops, or bands; but such a construction would require more labor and be easily affected by the weather, and for this reason I prefer the construction shown.

The operation of my invention will be readily understood from the foregoing description taken in connection with the annexed drawings. The protectors are set around the seed or plants by pressing the lower serrated edge, with a rotary motion, into the ground a short distance, in order that the protectors may have a firm support and be thereby held from accidental displacement. For protecting the seed and plants from worms, bugs, and other insects and small animals this will suffice without the cover F, as the obnoxious odor of the same will serve to prevent depredations from such causes.

When it is desired to protect the seed or small plants from the rays of the sun or from the frost or cold air, the covers F may be placed in proper position on the top of the protector, and held thereto by placing a small weight thereon, or by hooks and eyes or other suitable means.

The tapering form of the protector enables the same to be applied to the plants either end down without disturbing or injuring the plants in any possible manner, and it also permits the protectors to be packed closely together, one smaller size within the other, or all the same size together, in a very small compass, as more clearly illustrated in Fig. 4.

The protectors may be made without the taper, but in that case they would not be so convenient for transportation, storage, or handling for sale.

My improved plant and seed protector is simple and durable in construction, inexpensive to manufacture, efficient in use, and will prove of great utility and convenience for the purposes intended. By means of the same the plants will be protected from the ravages of bugs, worms, and small insects, and also from the conditions of the weather.

Small protectors may be useful to plant seed in, and also to protect seed after it has been planted, to hasten and insure germination, to permit transplanting, and obtain early growth and maturity.

It will be apparent that various modifications may be made without departing from the spirit or scope of my invention.

Having described my invention, I claim—

As an improvement in plant and seed protectors, the body A, formed in one piece of material and tapered from end to end, said body being saturated with a suitable composition to make it offensive to worms, bugs, and other insects, the ends of said body being open and formed with serrations, and a hinged cover for the upper end of the body, having hooks and eyes, as set forth.

In testimony that I claim the foregoing as my own I have hereto affixed my signature in presence of two witnesses.

ARTHUR PRENTISS.

Witnesses:
A. J. OTTE,
A. MERRITT.